Feb. 2, 1971  P. J. BROWNSCOMBE  3,560,083
MICROIMAGE READER

Filed Jan. 24, 1968  4 Sheets-Sheet 1

INVENTOR:
PHILIP J. BROWNSCOMBE
BY
Marzall, Johnston, Cook & Root
ATT'YS

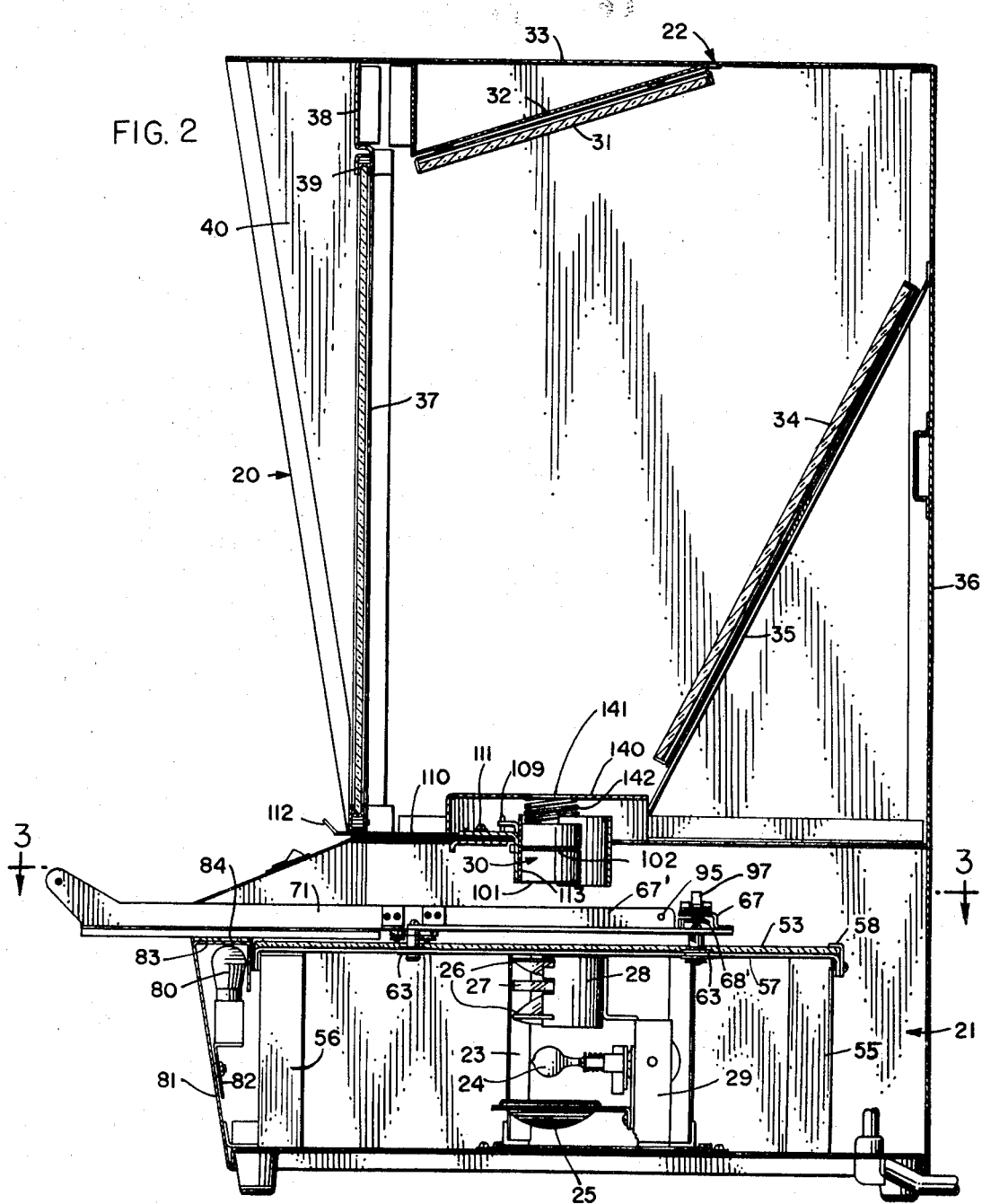

Feb. 2, 1971  P. J. BROWNSCOMBE  3,560,083
MICROIMAGE READER
Filed Jan. 24, 1968  4 Sheets-Sheet 3

INVENTOR:
PHILIP J. BROWNSCOMBE
BY
Marzall, Johnston, Cook & Root
ATT'YS

Feb. 2, 1971   P. J. BROWNSCOMBE   3,560,083
MICROIMAGE READER
Filed Jan. 24, 1968   4 Sheets-Sheet 4
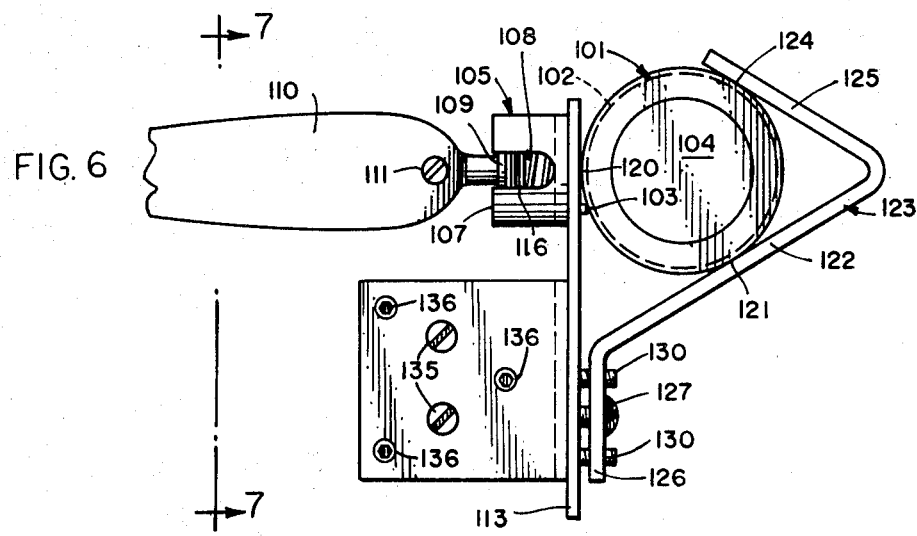
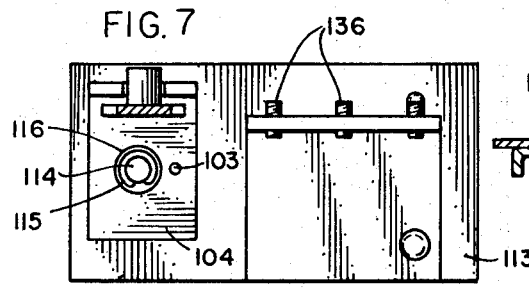
INVENTOR:
PHILIP J. BROWNSCOMBE
BY
Marzall, Johnston, Cook & Root
ATT'YS

United States Patent Office 3,560,083
Patented Feb. 2, 1971

---

3,560,083
MICROIMAGE READER
Philip J. Brownscombe, Millington, N.J., assignor to Eugene Dietzgen Co., Chicago, Ill., a corporation of Delaware
Filed Jan. 24, 1968, Ser. No. 700,125
Int. Cl. G03b 21/14
U.S. Cl. 353—22                                    7 Claims

ABSTRACT OF THE DISCLOSURE

Reader for selective projection of microimage on multi-image sheet with roller-guided sheet translating carriage, indexing means, constant focus construction, and adjustable mounting for focus lens.

BACKGROUND OF THE INVENTION

Readers for selectively projecting a segment of a microfilm or other type of microform such as a microfiche are generally known. This invention concerns improvements in structures for translating the microform across the light path of the reader for selective projection of a frame or other portion thereof. Other aspects of the invention concern indexing structure for quickly locating the desired frame, maintenance of a constant focus, and adjustable mounting of the focus lens.

A currently popular type of microform is known as a microfiche. It contains a plurality of small images printed on a plastic sheet, which is transparent or translucent. The microfiche, or a microfilm, may be mounted in a frame of cardboard, plastic, metal, etc. These units form convenient means for compact storage of business records, information, technical data, drawings, etc. For review thereof, the microform card is placed in a reader having a self-contained light projection system and a screen upon which the projected image can be read.

A common method for translating the microform card, i.e., movement thereof to the desired segment of the microform card into the light projection path, is that of mounting the microform card holder so that it can slide in one direction on a pair of ways, usually a pair of rods. These ways in turn can move in a second direction, generally at right angles to the aforesaid one direction, on a second pair of ways.

The two sets of ways must be straight and the plane of each set must be accurately parallel and at right angles to the axis of the light beam. Otherwise, the microimage will not remain at the constant distance from the focus lens as it is translated. When this occurs, the sharp focus of the image is lost. The precision construction required to maintain the aforesaid in parallel relationship requires adjustable mountings to provide the initial parallel relationship and for correcting any maladjustments which may occur during use or in transportation of the reader.

The present invention overcomes these problems by providing a simple and inexpensive construction for maintaining the proper focal relationship throughout the area covered during translation of the microform card from frame to frame or segment to segment. The invention further provides improvements in mounting of the focus lens as well as other improvements in microimage readers.

BRIEF DESCRIPTION OF THE INVENTION

The microimage readers of this invention are of the table type wherein the base contains the usual lamp housing embodying a lamp, reflector, and condenser lens and heat filter unit. The light is projected upwardly through the microimage, through an adjustable focus lens into an upper hood which is closed on five sides and has a light-translucent screen on the sixth side. The image is reflected by a set of mirrors onto the translucent screen where it can be read.

The improvements in maintaining the proper focus throughout the entire area of translation through the microform embodies upper and lower glass sheets between which the microimage is held in flat relationship. The lower glass slides on a flat support surface which is large enough to maintain the plane of support of the lower glass over its entire area of movement in translation of the image. Preferably, the lower glass has two strips of Teflon or other similar material which is made or machined parallel to the upper surface of the lower glass. The latter surface determines the plane of the microform.

The support for the lower glass must be almost absolutely flat or planar. The tolerance limit for variation is in the order of 0.002 inch if a constant focus is to be maintained throughout the entire translation of the microform. Plate glass is ideally suited as the support member because it is relatively inexpensive and can be obtained with flatnesses within the aforesaid tolerances. Glass also provides a smooth, hard surface adapted to withstand the wear of sliding the microform holder across said surface for a large number of times. A relatively heavy metal sheet is also a feasible support, but it is generally more expensive to manufacture to flatnesses within the aforesaid tolerances. The glass sheet or other support surface has a hole near its center where the light path projects therethrough. Even with glass, the hole is desirable inasmuch as it prevents loss of light, reflections and obstructions by dirt accumulated on the glass surface.

The double glass film holder rests in a carriage. The carriage is one allowing movement in directions substantially at right angles to each other. The carriage is guided in one of these directions by rollers which roll along the edge of frame structure supporting the support plate and by another set of rollers at right angles thereto, which rollers coact with a cross bar or member on the carriage at substantially right angles to the aforesaid edges of the frame structure. It is not essential that the carriage be made with a great degree of precision inasmuch as it does not determine the plane of the microform during translation. Its primary function is to avoid objectionable rotating of the microform during translation.

The carriage has a handle accessible at the front side of the reader. It may also embody a holder for an indexing card having a transparent or translucent sheet containing indexing frame numbers corresponding with the respective frames on the microform. This indexing sheet moves with the carriage over a small, illuminated opening whereby the frame number being projected on the screen can be determined by reading the illuminated index sheet.

The adjustable mounting of the focus lens provides a convenient and quick technique for mounting the focus lens in the reader. It embodies a base plate carrying a V-shaped arm. The support for the focus lens barrel is a 3-point support and the V-shaped arm can be adjusted by adjustment screws to provide a parallel alignment of the contact lines of the lens barrel with each of the V-shaped arms and the base plate.

DESCRIPTION OF THE DRAWINGS EMBODIMENTS

The drawings illustrate a preferred embodiment of the invention wherein:

FIG. 2 is a vertical section taken on section plane 2—2 of FIG. 1;

FIG. 6 is a top plan view of the lens barrel holder and lens focusing mechanism;

FIG. 7 is a rear elevation thereof as viewed from section plane 7—7 of FIG. 6;

FIG. 8 is a side elevation thereof, partly in section; and

FIG. 9 is a front elevation thereof.

DESCRIPTION OF PREFERRED EMBODIMENTS

Figure 1:
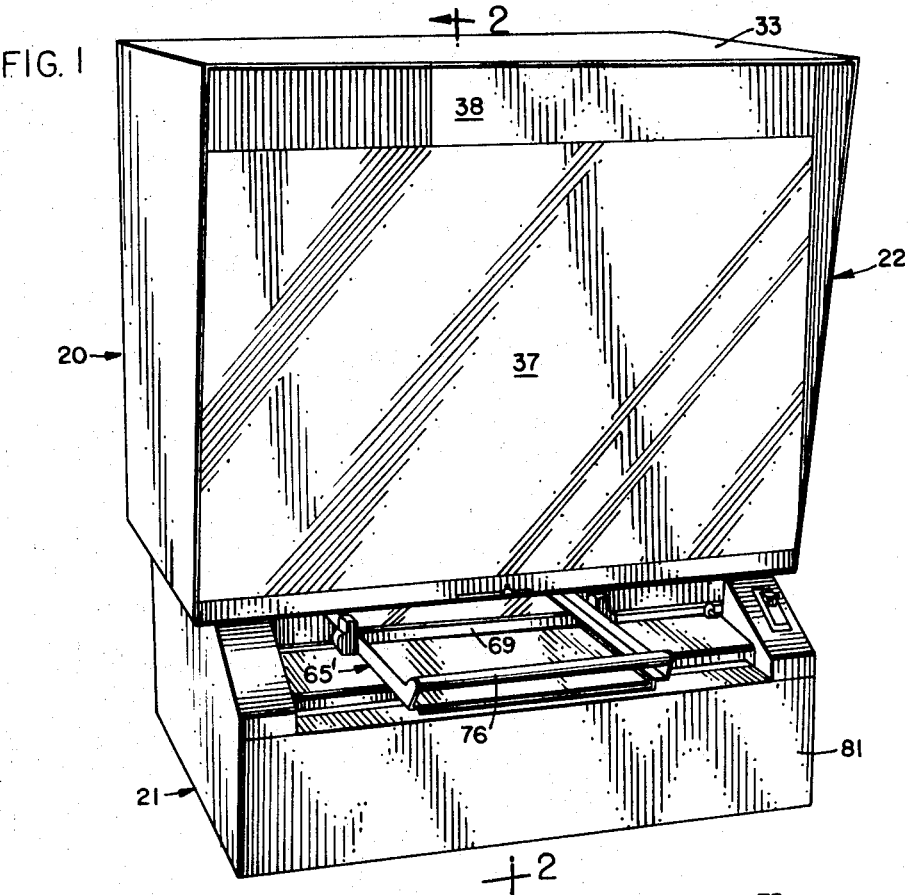
FIG. 1 is a front perspective view of the embodiment.

Referring to the drawings, the reader 20 comprises a lower, base housing 21 and an upper hood 22. The housing 21 contains a lamp housing 23 of conventional design and construction. The essential elements thereof are a lamp 24 beneath which is provided a concave reflector 25, and above which are located condenser lenses 26 and heat filter element 27 held in a lens holder 28. The lamp 24, the reflector 25, and the lens holder 28 are mounted on a base 29 in a conventional manner.

The aforesaid elements project a light beam upwardly through a focusing lens 30, the details of which are described hereinafter. The upwardly directed light beam strikes a mirror 31 supported by bracket 32 on the top wall 33 of the hood 22. The light is reflected to mirror 34, which is angularly supported by bracket 35 on the rear wall 36 of housing 22. From the mirror 34 the light beam is projected onto a translucent screen 37 positioned in the open front of the five-sided hood 22, on which screen the image is viewed. The screen 37 has a frame 39 and is supported in the front opening of housing 22 by conventional attaching means. A cross frame element 38 extends across the upper edge of screen 37. A light shield 40 on hood 22 shades the screen from direct overhead light.

The microform sheet containing the image to be projected is held flat between an upper glass plate 50 and a lower glass plate 51. The lower surface of the lower glass plate 51 has a pair of Teflon strips 52 adhered thereon. The lower surfaces of strips 52 are parallel with the upper surface of the lower glass plate 51, against which is pressed the microform sheet to be read on screen 37.

Figure 3:
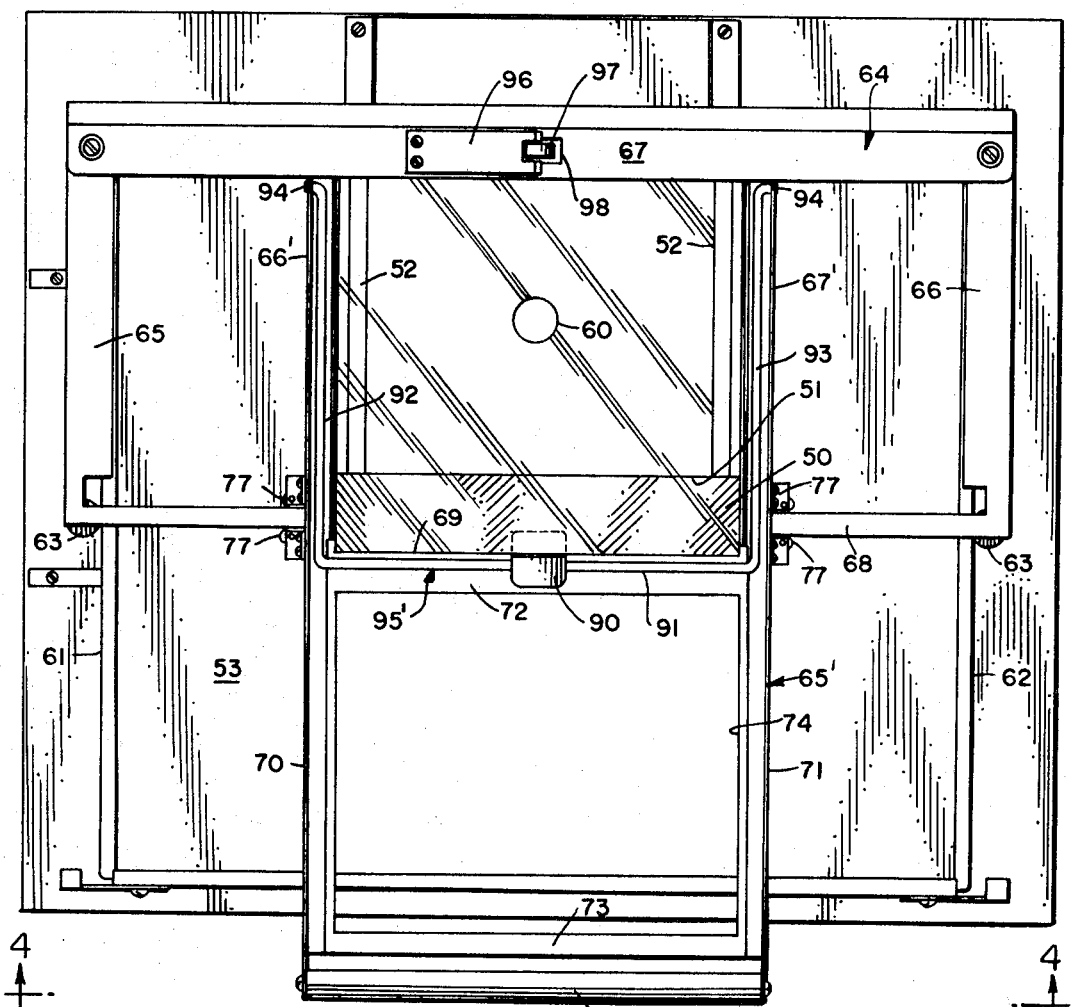
FIG. 3 is a top plan view of the microform translating mechanism as seen from section plane 3—3 of FIG. 2.
Figure 4:
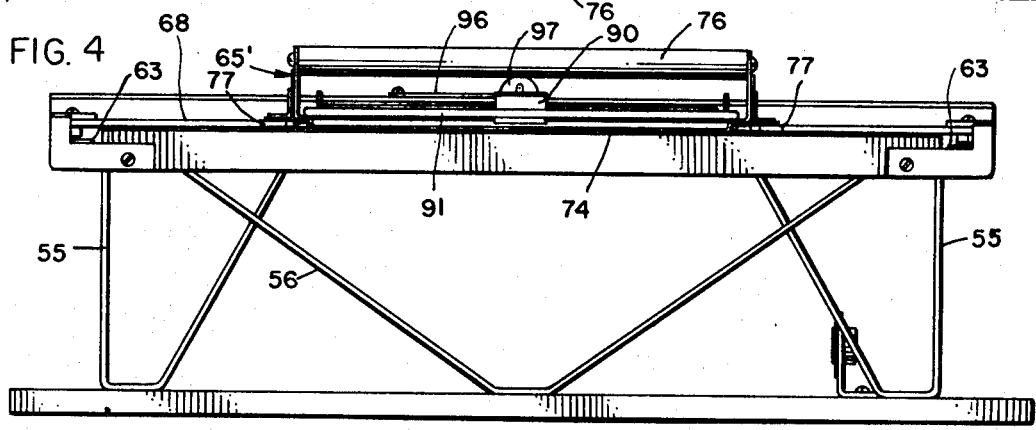
FIG. 4 is a front elevation of the frame structure of the base portion of the reader as viewed from plane 4—4 of FIG. 3.

The strips 52 of the lower glass plate 51 rest flatly on the upper surface of the support glass plate 53 (FIGS. 2 and 3). The support frame for glass plate 53 has a tripod leg arrangement composed of two rear legs 55 and a V-front leg 56. These legs are heavy gauge metal strips or bars bent in the shape shown in FIG. 4. The glass plate 53 is held by clips 58 on frame plate 57. The glass plate 53 and frame plate 57 have a hole therein directly below the focusing lens 30 for passage of the light beam therethrough in the path previously described, i.e., hole 60.

The side edges 61 and 62 of the frame plate 57 project beyond the side edges of the glass plate 53. These projecting edges form respective tracks for grooved wheels 63 provided in respective pairs on opposite sides of the open carriage frame 64.

The latter frame comprises side bars 65 and 66, a rear cross channel 67, and a front bar 68. The carriage frame 64 is adapted to move in a forward and rearward direction by virtue of the aforesaid roller mounting.

Figure 5:
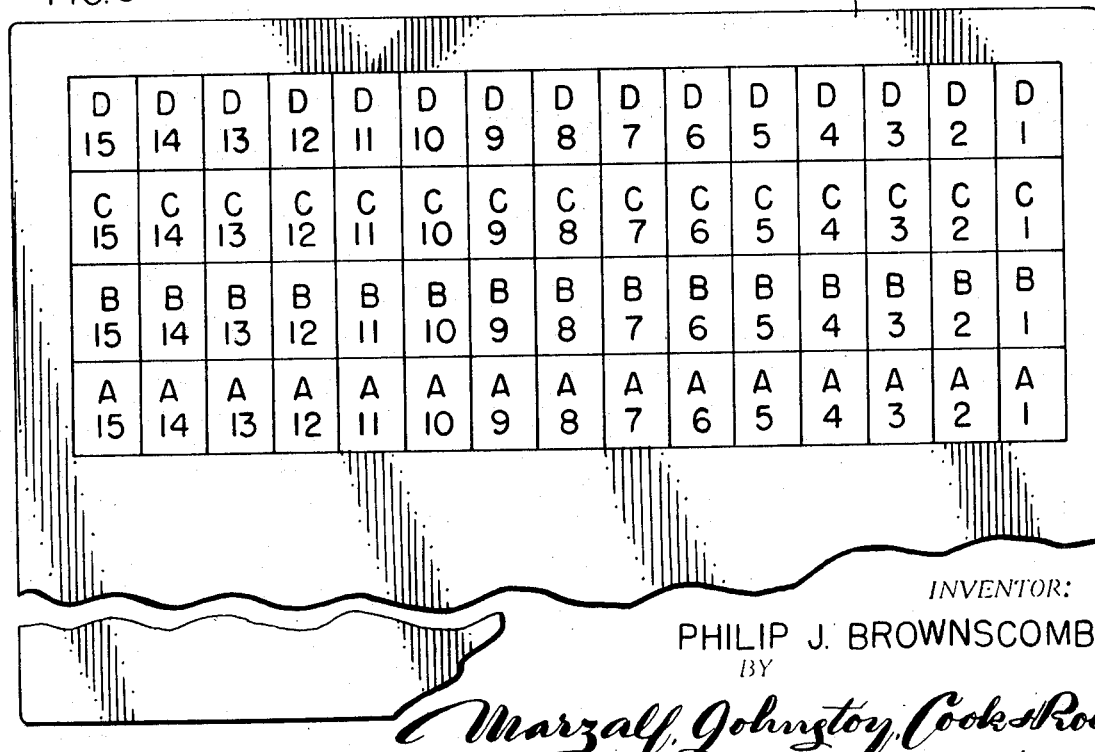
FIG. 5 is a fragmentary plan view of an indexing sheet.

The carriage frame 64 supports a second carriage frame 65' which is movable in a side to side direction relative to frame 64. The frame 65' has an open well formed by side channels 66' and 67', backstop channel 68', and a front channel 69. The members forming this well hold the glass plates 50 and 51 loosely therein whereby the strips 52 of the lower plate 51 lie flat on the glass support plate 53. The forward portion of the frame 65' comprises side frame members 70 and 71, a rear frame member 72, and a front frame member 73 which form an open well 74. This open well receives an indexing card 75, which is shown in FIG. 5. A handle 76 extends across the front portion of the side frame members 70 and 71, which handle is used to position the carriage at the desired frame on the microform being read in the machine.

The side to side movement of the carriage 65 is guided by four rollers 77. The rollers 77 are supported on the side frame members 66', 67', 70 and 71 with the rollers in guiding contact with front and rear faces of the cross bar 68 of carriage 64. Thus, rollers 77 guide and restrict movement of carriage 65' relative to carriage 64 in a direction substantially at right angles to the front to rear movement of carriage 64.

The indexing card illumination is provided by a small lamp 80 mounted on the front wall 81 of the base housing 21 by a bracket 82 (FIG. 2). The upper wall 83 of the front portion of the housing 21 has a light aperture 84 of the approximate size of a frame on the indexing card 75 whereby the operator of the reader can ascertain, from the illuminated index square, the corresponding frame being projected onto the screen. Inasmuch as the optical system of this particular machine reverses the image in projection thereof onto the screen 37, the indexing card is oriented accordingly, i.e., the lower righthand frame A1 corresponds to the upper lefthand frame on the image containing sheet held between plates 50 and 51.

The central portion of the front edge of the upper plate 50 rests on a tab 90, which in turn is attached to a midportion of the leg 91 of a wire bent in the shape of a U. The side legs 92 and 93 thereof have outwardly turned ends 94 which are rotatably seated in apertures 95 (FIGS. 2 and 3) in the rear ends of the side channels 66' and 67'. The U-shaped wire 95' thus provides a pivot support by which the upper glass 50 can be pivotally raised for insertion or removal of the microform sheet between the glass plates 50 and 51.

The rear channel 67 has a spring arm 96 mounted thereon (FIGS. 2 and 3). The free end of the spring arm carries a roller 97 which extends through an aperture 98 in the channel 67. This roller rides on the rear frame channel 68' (FIG. 2) of the carriage 65' and keeps the latter from tipping in the event downward pressure were exerted on the front portion of the frame 65', e.g., on the handle 76.

The focusing lens and its mounting is illustrated in FIGS. 2 and 6–9. The barrel 101 for focusing lenses 104 has a circumferential groove 102 in which is seated an eccentric pin 103. The pin 103 is positioned eccentrically on the vertical leg 104 of a pivotable L-bar 105. The horizontal leg 107 of the pivotable member 105 has a slot 108 in which the upstanding ear 109 of the pivot lever 110 is seated. Pivot lever 110 is pivoted at screw 111 and has a grip portion 112 projecting below the screen 37.

The leg 104 is pivotally mounted on a base plate 113 by a pin 114 having a retaining ring 115 holding thereon a coil spring 116. The spring 116 urges the leg 104 against the mounting plate 113.

Upon swinging the grip portion 112 to the left or right, the pivot member 105 is pivoted, and pin 103, by virtue of its eccentric mounting, is raised or lowered to move the lens barrel 101 upwardly or downwardly.

The lens barrel 101 has a 3-point mounting which guides its vertical movement. The three points are a vertical contact line 120 at the face of mounting plate 113, a vertical contact line 121 on the inner face of a leg 122 of the mounting member 123 and the vertical contact line 124 on the inner face of the other leg 125.

The mounting member 123 comprises a plate having a base leg 126 held by screws 127 on the mounting plate 113. The legs 122 and 125 form a V which faces the mounting plate 113. The lens barrel 101 is cradled therein with just enough clearance to permit it to slide upwardly and downwardly upon movement of the eccentric pin 103.

In order to orient the contact lines 120, 121 and 124 so that they are parallel, the base leg 126 of the mounting member 123 has threaded therein three set screws 130 in a tripod arrangement. These set screws are used for adjusting the relative positioning of contact lines 121 and 124 to contact line 120 to obtain the desired parallel relationship.

The base plate 113 is mounted on a frame channel 131 of the base member 21 by an L-bracket 132. The vertical leg 133 thereof is affixed to the back face of the mounting plate 113 while the horizontal leg 134 is secured to channel 131 by two screws 135. The horizontal leg 134 also has a tripod arrangement of three set screws 136 whereby the lens barrel mounting system can be oriented to provide the desired projection of the light path into the hood portion 22 of the reader. The lower portion of the latter is provided with an apertured shield 140 having a light aperture 141 above the lens barrel. A spring 142 is situated between the light shield 141 in the lens barrel and urges the latter downwardly. The function of this spring is to eliminate minor backlash movements of the lens barrel after the focal adjustment obtained through movement of the lever 110.

The invention is hereby claimed as follows:

1. A microform reader comprising a support plate having a substantially planar upper surface with a tolerance variation limit of 0.002 inch, a transparent microform holder lying flat on said upper surface and being slidably disposed thereon, said holder including a lower glass plate, a pair of spaced, thin strips adhered to the lower surface of said lower plate near the respective opposite edges thereof, the lower surface of said strips being parallel with the upper face of said lower glass plate, an upper glass plate lying on the upper surface of said lower glass plate and adapted to hold a microform down flatly against said upper surface of said lower plate, the lower surfaces of said strips lying flatly on said upper surface of said support plate, means for projecting a light beam through an aperture in said support and through said holder to project an image of said microform, and translating means acting only against the edges of said plates of said holder for slidably translating said holder across said plate to place a selected image of said microform in the path of said light beam and to maintain said strips flatly at all times on said upper surface.

2. A reader as claimed in claim 1, a frame supporting said support plate, a carriage above said support plate, means within said carriage for receiving said transparent microform holder, and grooved rollers mounted on said carriage and rolling on opposite edges of said frame to provide reciprocal guiding of movement of said carriage and said holder therein across said plate.

3. A reader as claimed in claim 2, a second carriage supported on said first mentioned carriage and containing said holder, and roller means mounted on said second carriage and coacting with said first-mentioned carriage to guide relative motion of said carriages at right angles to each other across said plate.

4. A reader as claimed in claim 3, said first-mentioned carriage having a straight bar extending at right angles to reciprocal movement of said first-mentioned carriage, and said roller means on said second carriage rolling against said straight bar.

5. A reader as claimed in claim 1 wherein said support plate is a glass plate.

6. A reader as claimed in claim 3, index card receiving means movable with said translating means, a member with a light aperture beneath said index card receiving means, and a lamp projecting light through said aperture and the portion of index card thereabove to illuminate a segment of said index card.

7. A reader as claimed in claim 6, wherein said index card receiving means comprises frame members on said second carriage forming an open bottom, index card receiving well.

References Cited

UNITED STATES PATENTS

| 1,237,239 | 8/1917 | Bunnell | 95—4.5 |
| 2,660,920 | 12/1953 | McChesney | 353—27 |
| 2,701,979 | 2/1955 | Pratt et al. | 355—27 |
| 3,472,585 | 10/1969 | Halberg et al. | 353—27 |
| 2,501,453 | 3/1950 | Rowe et al. | 353—27 |
| 3,424,524 | 1/1969 | Akiyama et al. | 353—27 |
| 3,442,581 | 5/1969 | Smitzer et al. | 353—27 |

FOREIGN PATENTS

| 867,758 | 2/1953 | Germany | 353—25 |
| 1,430,277 | 1/1966 | France | 353—27 |

HARRY N. HAROIAN, Primary Examiner

U.S. Cl. X.R.

353—27, 78, 101